United States Patent Office 3,165,478
Patented Jan. 12, 1965

3,165,478
PROCESS FOR THE REGENERATION OF RANEY-NICKEL CATALYST
Ulrich Hauschild, Hannover, and Horst Nicolaus, Nurnberg, Germany, assignors to Kali-Chemie Aktiengesellschaft, Hannover, Germany
No Drawing. Filed Aug. 3, 1961, Ser. No. 130,226
Claims priority, application Germany, Aug. 5, 1960, K 41,390 IVa/12i
8 Claims. (Cl. 252—413)

It has been known that $H_2O_2$ can be prepared by subsequent hydrogenation and oxidation in a cyclic process of an alkyl anthraquinone or another anthraquinone compound in a reaction solution which is not miscible with water. The $H_2O_2$ formed in this process after the oxidation step is extracted preferably with water.

In the hydrogenation step of this process usually one of the known metallic hydrogenation catalysts, such as palladium, platinum or Raney-nickel must be used. In the use of palladium or platinum as catalyst it is thereby very advantageous to apply the catalyst to carrier substances, e.g. aluminum oxide, magnesium oxide, calcium phosphate or activated carbon in order to attain an increased efficiency, while the Raney-nickel catalyst is in general used as such.

After the formation of the respective hydroquinone and separation of the hydrogenation catalyst, the solution is passed to the oxidizing step, in which the quinone is oxidized with air or oxygen whereby the quinone is regenerated. This reaction can be carried out without the use of a catalyst. Subsequently the $H_2O_2$ formed is extracted with water and the reaction solution is reintroduced into the hydrogenation step.

In carrying out this process continuously, the activity of the hydrogenation catalyst gradually decreases so that continually fresh catalyst must be added. In this manner considerable amounts of not usable catalyst accumulate, which must be regenerated.

Several processes have been suggested previously for the re-activation of hydrogenation catalysts. Thus, it has been known from the art to treat a palladium or platinum catalyst of the type used in the above described anthraquinone process with a substance having an oxidizing action, in a neutral or alkaline aqueous solution. Furthermore, an exhausted palladium or Raney-nickel catalyst can be reactivated by treating it with a non-oxidizing, aqueous alkaline solution, such as NaOH solution, at elevated temperature. The dilute solution of an alkali hydroxide in water or alcohol has likewise a regenerating effect on Raney-nickel in the presence of hydrogen in a temperature range of 40–150° C., the catalyst being subsequently washed with water. According to another process the catalyst is reactivated in the hydrogenation vessel by periodically reducing the pressure of hydrogen which is in contact with the liquid phase, and passing an inert gas through the liquid which contains the catalyst or bringing said inert gas in contact with the catalyst while the hydrogen pressure is reduced.

In using Raney-nickel as hydrogenation catalyst in the preparation of $H_2O_2$ over organic compounds, the prior art processes for regeneration of the exhausted catalyst are not satisfactory as they do not have a satisfactory effect. The reactivation obtainable by these processes lasts for a relatively short period of time only and the further special processing to a catalyst which has no catalytic effect on the formation of undesired by-products, is troublesome and expensive.

It has now been found that the exhausted or inactive Raney-nickel can be practically completely regenerated in a simple manner without the occurrence of the before-mentioned disadvantages, by treating the catalyst to be reactivated with the alcoholic solution of a carboxylic acid. It is thereby a particular advantage that the catalyst thus reactivated does not have the effect of producing substances which are too strongly hydrogenated and are undesirable in the above described anthraquinone process. The activity of the catalyst treated according to the present invention is comparable to the activity of the fresh catalyst originally introduced into the process.

Due to the fact that catalysts regenerated according to this invention do not have the effect of producing too strongly hydrogenated products, after-treatments of the catalyst for eliminating such effect are unnecessary. A time-consuming and expensive dehydration of the catalyst is likewise unnecessary, because the treatment takes place in organic solvents.

The temperature of the treatment depends on the particular carboxylic acid used. Room temperature of e.g. 15–25° C. can be used in the case of a lower carboxylic acid, while in the treatment of carboxylic acids having a relatively long chain, a higher temperature of about 50° C. should be preferred. The duration of the treatment is also dependent on the specific carboxylic acid used, but a treatment for 1–3 hours is sufficient almost in all cases. The most favorable concentrations of the carboxylic acid in the alcohol solution are in the range of 10–50%.

It has been found that acetic acid has a particularly favorable effect in carrying out the invention. The acetic acid is used preferably in the form of a 30% alcoholic solution. The exhausted Raney-nickel is introduced into this solution and is stirred at a temperature between 20° and 50° C. for 1–2 hours. It has been found that the presence of a small amount of water, e.g. 8–10%, in the organic solution has a favorable effect. After the treatment the catalyst is washed with alcohol and is then ready for use.

Likewise good results are obtained with other carboxylic acids, such as propionic acid, butyric acid, caproic acid, capric acid, palmitic acid, stearic acid, oleic acid, lactic acid, malonic acid, succinic acid, adipic acid, maleic acid, fumaric acid, tartaric acid, pyroracemic acid, benzoic acid and others. The effect of formic acid and oxalic acid is less favorable.

The regenerating process of this invention is carried out preferably in the inert atmosphere, e.g. in a nitrogen atmosphere in order to prevent contact with oxygen. In most cases the regenerated catalyst has to take up hydrogen before attaining its full activity, so that the treatment according to the invention can be carried out preferably also in a hydrogen atmosphere.

The following examples describe some specific embodiments of and best modes for carrying out the invention, to which the invention is not limited.

*Example 1*

50 grams of an exhausted Raney-nickel catalyst obtained in the anthraquinone process for preparing $H_2O_2$, were added to a solution of 140 ml. methanol, 60 ml. glacial acetic acid and 20 ml. of water. The solution was stirred in a nitrogen atmosphere at 25° C. for 1 hour. Subsequently the liquid was removed and the catalyst was washed 3 times with small portions of methanol, until the last washing liquid was colorless. This regenerated catalyst could be kept under methanol or taken up in another inert liquid, e.g. benzene.

The hydrogenating capacity of the regenerated catalyst was tested in a solution consisting of 500 ml. of trimethylbenzene, 400 ml. octylalcohol and 30 grams of 2-ethyl-anthraquinone. 800 grams of this solution were filled into a 2-liter flask, 15 grams of the regenerated catalyst were added and the air in the flask was replaced by hydrogen. Under a constant hydrogen pressure of 1 atmosphere, the contents of the flask was vigorously stirred and the absorbed volumen of gas was measured. After attaining the full activity of the catalyst, the result was a value of 1490 ml. of hydrogen in 20 minutes. If in a parallel test under otherwise equal conditions an equal amount of non-regenerated catalyst was used, the absorption of 1490 ml. of hydrogen required 230 minutes. The original activity of the catalyst used in the first charge—based on 15 grams—amounted to 1760 ml. hydrogen per 20 minutes.

*Example 2*

In a manner similar to that described in Example 1, 50 grams of a used, and to a considerable extent exhausted Raney-nickel catalyst were added to a solution consisting of 140 ml. methanol, 60 ml. glacial acetic acid and 20 ml. of water, but this suspension was kept for 1 hour under constant stirring and in a nitrogen atmosphere at 40° C. After further processing (as in the above Example 1) the activity of 15 grams catalyst in the test solution described in Example 1 was measured and found to be 1380 ml. of absorbed hydrogen in 15 minutes. In order to absorb this volume of hydrogen the Raney-nickel catalyst prior to regeneration required 100 minutes. The activity of 15 grams of the original catalyst in the same test solution amounted to 1360 ml. hydrogen in 15 minutes.

*Example 3*

Into a solution consisting of 47 ml. of methanol, 20 ml. of glacial acetic acid and 6 ml. of water, 50 grams of an exhausted Raney-nickel catalyst were introduced. In an atmosphere of nitrogen the suspension was stirred at 40° C. for 2 hours and then further treated and the activity of the catalyst measured in the manner described in Example 1. Measurement of the hydrogenating activity resulted in the value of 1580 ml. hydrogen in 30 minutes, based on 15 grams of the catalyst. The exhausted catalyst required 128 minutes for the absorption of 1560 ml. of hydrogen under otherwise equal conditions.

In any of the Examples 1–3, 2-ethyltetrahydroanthraquinone was either not formed or formed in only very small quantity in the test solution. The proportion of the hydrogenation velocity of the aromatic nucleus relative to that of the quinone groups in the case of nuclear hydrogenation observed was always below 1:150.

*Example 4*

A Raney-nickel catalyst which has been used in the production of $H_2O_2$ according to the alkylanthraquinone process for an extended period of time and the activity of which according to the test solution described in Example 1 amounted to only 1000 ml. of hydrogen in 115 minutes, was treated with propionic acid. This was done by introducing about 50 grams of said catalyst into 100 ml. of a 35% solution of propionic acid in ethanol, to which 5% by weight of water was added. The resulting mixture was stirred in the absence of air for 2 hours at 40° C. Subsequently the liquid was decanted, the catalyst was washed with ethanol and its activity was measured by means of the test solution in the manner described in Example 1. The absorption of hydrogen amounted to 1000 ml. of hydrogen in 25 minutes, based on 15 grams of the catalyst.

*Example 5*

50 grams of the exhausted catalyst described in Example 4 were dissolved in 200 ml. of a solution consisting of 10% of maleic acid and 90% of cyclohexanol. The resulting mixture is treated in a nitrogen atmosphere at 40° C. under stirring for 1 hour. After decanting the liquid and washing the catalyst with alcohol an activity of 1000 ml. hydrogen absorption in 35 minutes was measured in the manner described in Example 1.

*Example 6*

Into 150 ml. of a 20% solution of benzoic acid in methanol 50 grams of the exhausted Raney-nickel catalyst described in Example 4 were introduced under stirring. The resulting suspension was left in a nitrogen atmosphere at 40° C. for 2 hours and then further processed in the manner described in Example 4. While the activity of the Raney-nickel used in this example was 1000 ml. of hydrogen in 115 minutes, after the treatment with benzoic acid it was 1000 ml. of hydrogen in 36 minutes, based on 15 grams of the catalyst.

*Example 7*

50 grams of the exhausted Raney-nickel catalyst described in Example 4 were added under stirring in a current of nitrogen to 200 ml. of a 15% solution of tartaric acid in isopropanol, and stirring was continued at 30° C. for 2 hours. After further processing the mixture thus obtained in the manner described in Example 4, the activity of the catalyst was 1000 ml. of hydrogen in 31 minutes based on 15 grams of Raney-nickel.

It will be understood from the above that this invention is not limited to the particular conditions, materials, steps and other details specifically described above and can be carried out with various modifications. For example, the carboxylic acid may be present in the alcoholic solution in an amount of 10–50%, and the amount of water in the alcoholic solution may be in the range of 8–10% based on the weight of the solution. The parts and percent mentioned herein are by weight if not otherwise stated. Any of the beforementioned carboxylic acids can be used for carrying out the invention in the manner described in the above Examples 1–7. As solvent for the carboxylic acid any of the lower aliphatic and cycloaliphatic monofunctional alcohols can be used, i.e. methanol, ethanol, iso- and n-propanol, iso- and n-butanol, cyclohexanol and others.

It will be appreciated that the process of the present invention represents an improvement of high utility. The utility resides in the regeneration of the used or exhausted Raney-nickel catalyst used in the hydrogenation step of the above described process for producing $H_2O_2$ by a simple and efficient procedure. By the process of this invention the hydrogenating effect of the exhausted Raney-nickel catalyst can be restored and the introduction of fresh catalyst into the process becomes unnecessary or is considerably reduced.

What is claimed is:

1. A process for the regeneration of Raney-nickel catalysts used in the production of hydrogen peroxide over organic compounds in the hydrogenation steps, comprising contacting the used catalyst under exclusion of free oxygen, at a temperature in the range between ordinary room temperature of 15–25° C. and 50° C., with the solution of carboxylic acid in an alcohol, the carboxylic acid being selected from the group consisting of acetic acid, propionic acid, butyric acid, caproic acid, capric acid, palmitic acid, stearic acid, oleic acid, lactic acid, malonic acid, succinic acid, adipic acid, maleic acid, fumaric acid, tartaric acid, pyroracemic acid and benzoic acid, and the alcohol being selected from the group consisting of lower aliphatic and cycloaliphatic monofunctional alcohols and using 1.5 to 4.5 parts of the alcoholic solution containing 10 to 50% of the carboxylic acid for one part of the catalyst to be regenerated.

2. A process as claimed in claim 1, in which acetic acid is used as the carboxylic acid.

3. A process as claimed in claim 1, in which contacting of the catalyst is carried out between 20° and 45° C.

4. A process as claimed in claim 1, in which the alcoholic solution of the carboxylic acid contains 8 to 10% of water.

5. A process as claimed in claim 1, in which contacting the catalyst with the carboxylic acid solution is carried out in an atmosphere of an inert gas.

6. A process as claimed in claim 1, in which the catalyst contacted with carboxylic acid solution is subjected to a treatment with hydrogen prior to its use in the production of $H_2O_2$.

7. A process as claimed in claim 5, in which the inert gas is nitrogen.

8. A process as claimed in claim 5, in which contacting the catalyst with the carboxylic acid solution is carried out in a hydrogen atmosphere.

References Cited by the Examiner

UNITED STATES PATENTS 2,006,221  6/35  Ridder _____ 252—413

FOREIGN PATENTS 692,300  6/53  Great Britain.
797,111  6/58  Great Britain.

MAURICE A. BRINDISI, *Primary Examiner.*